(12) United States Patent
Zanin

(10) Patent No.: US 7,562,939 B2
(45) Date of Patent: Jul. 21, 2009

(54) MOTOR VEHICLE WHEEL

(75) Inventor: Andrea Zanin, Villanova Di Camposampiero (IT)

(73) Assignee: Marilena Stefanello, Vigonza (IT)

( * ) Notice: Subject to any disclaimer, the term of this patent is extended or adjusted under 35 U.S.C. 154(b) by 121 days.

(21) Appl. No.: 11/700,937

(22) Filed: Feb. 1, 2007

(65) Prior Publication Data

US 2007/0182240 A1 Aug. 9, 2007

(30) Foreign Application Priority Data

Feb. 7, 2006 (IT) .................... PD20060016 U

(51) Int. Cl.
*B60B 7/14* (2006.01)
(52) U.S. Cl. ................ 301/37.372; 301/37.102; 301/37.371
(58) Field of Classification Search ................
301/37.101–37.102, 37.28, 37.34, 37.371–37.372
See application file for complete search history.

(56) References Cited

U.S. PATENT DOCUMENTS

| | | | |
|---|---|---|---|
| 5,141,291 A * | 8/1992 | Roulinson | 301/37.34 |
| 5,443,582 A | 8/1995 | Ching | |
| 5,520,445 A * | 5/1996 | Toth | 301/37.372 |
| 5,577,809 A | 11/1996 | Chase | |
| 5,820,225 A * | 10/1998 | Ferriss et al. | 301/37.371 |
| 6,017,096 A * | 1/2000 | Russell | 301/37.36 |
| 6,068,350 A | 5/2000 | Baumgarten et al. | |
| 6,325,461 B1 * | 12/2001 | Hauler | 301/37.372 |
| 6,663,189 B2 * | 12/2003 | Enomoto et al. | 301/37.36 |
| 6,805,413 B2 * | 10/2004 | Fitzgerald | 301/37.106 |

FOREIGN PATENT DOCUMENTS

WO WO 2004/028832 A 4/2004

\* cited by examiner

*Primary Examiner*—Jason R Bellinger
(74) *Attorney, Agent, or Firm*—Modiano & Associati; Albert Josif; Daniel J. O'Byrne

(57) ABSTRACT

A motor vehicle wheel, comprising a structural body formed by an outer rim with which the tire is to be associated, by a hub and by at least one spoke for connecting the rim to the hub; the structural body is made of steel. The wheel advantageously comprises a wheel cover for covering the exposed parts of the structural body which is made of metallic light alloy. The wheel cover is fixed to the structural body by way of elements for mechanical interconnection of the type which can be removed at least from the wheel cover. The wheel cover is provided with receptacles for the insertion of the bolts for fixing the rim to the axle of the motor vehicle. The mechanical interconnection elements are separate from the bolts for fixing the wheel to the axle of the motor vehicle.

14 Claims, 4 Drawing Sheets

MOTOR VEHICLE WHEEL

The present invention relates to a motor vehicle wheel and to a wheel cover which can be used on said wheel.

BACKGROUND OF THE INVENTION

As is known, motor vehicle wheels, particularly car wheels, are divided substantially into two categories: steel wheels and light alloy wheels.

Light alloy wheels have a higher performance than steel wheels and generally have a better aesthetic finish.

The production cost of the light alloy wheels is also higher than that of steel wheels.

Steel wheels are generally covered by a wheel cover for concealing at least partially from sight the hub and the spokes that connect the hub to the rim, and have a protective and aesthetic finishing purpose.

Such wheel covers are made of plastics and are fixed to the rim of the wheel by means of peripheral clips; said clips allow both easy coupling of the wheel cover to the wheel and easy removal therefrom.

When it is necessary to change a tire due to a puncture, it is generally necessary to remove the wheel cover and act on the bolts (the screws for fixing the hub of the wheel to the axle are commonly known as "bolts" although they are not associated with a nut).

However, the ease with which said wheel covers can be removed from the wheel leads to two problems: a first problem is linked to easy theft of the wheel covers and the second problem is linked to the real possibility of losing the wheel covers while the vehicle is moving.

It should also be noted that the aesthetic impression conveyed by such plastics wheel covers is of low quality.

The aesthetic enhancement that the wheels give to the buyer of a motor vehicle is instead very important: the possibility for a motor vehicle dealer to provide, as an accessory of the vehicle, wheels which have a pleasant appearance is in fact a very important commercial leverage point.

Motor vehicle dealers therefore seek to provide vehicles with wheels whose aesthetics is equal to that of light alloy wheels (even when the wheels are not required to have a performance comparable to that of light alloy wheels) while trying to reduce their costs.

In order to solve this problem, one solution has been to provide a wheel cover made of plastic material which has a layer of aluminum alloy metal on its exposed surface.

However, this solution entails a system for fixing the wheel cover to the wheel which is of a traditional type, by means of the so-called peripheral clips or also by coupling the bolts for fixing the wheel to the axle of the vehicle.

Perforated receptacles are in fact provided on the wheel cover, and the heads of the bolts abut against their bottom, thus locking the wheel cover in a sandwich-like fashion against the hub of the wheel.

It is evident that this solution does not solve the problem of the risk of loss or theft of the wheel cover in the case of fixing means such as peripheral clips, whereas if the bolts retain the wheel cover, in the long term the pressure of the bolts on the bottom of the receptacles causes the deterioration of such receptacles, with the real possibility of the formation of cracks and consequent breakage of the wheel cover.

Another solution, which however is limited to the case of light alloy wheels, entails the possibility to provide a wheel cover made of aluminum alloy with a surface finish which is superior to that of the wheel; said wheel cover matches exactly the shape of the hub and spokes of the wheel and is glued thereto, in practice so as to form a wheel in which the wheel cover is integrated.

This solution, if transferred to the case of steel wheels, is scarcely applicable, both due to the real risk of less than optimum bonding power of the adhesive used to fix the wheel cover and due to the need to provide the wheel and the wheel cover with exactly the same shape, entailing an increase in the production costs of wheels, which are generally standardized in their shape for each car model and are subsequently differentiated by the type of wheel cover applied.

SUMMARY OF THE INVENTION

The aim of the present invention is to provide a wheel for motor vehicles which solves the problems linked to known types of wheel.

Within this aim, an object of the present invention is to provide a wheel for motor vehicles which is made predominantly of steel and has an aesthetic finish which is comparable to that of wheels completely made of light alloy.

Another object of the present invention is to provide a motor vehicle wheel with an aesthetic finish which is comparable to that of wheels made entirely of light alloy and has a wheel cover which is extremely rigidly coupled to the structure of the wheel, eliminating the risk of losing it due to theft or during vehicle motion.

Another object of the present invention is to provide a cover for wheels which solves the drawbacks noted in the background art.

This aim and these and other objects, which will become better apparent hereinafter, are achieved by a motor vehicle wheel, which comprises a structural body formed by an outer rim with which the tire is to be associated, by a hub and by at least one element for connecting said rim to said hub, said structural body being made of steel, characterized in that it comprises a wheel cover for covering the exposed parts of said structural body, said wheel cover being made of metallic light alloy and being fixed to said structural body by way of elements for mechanical interconnection of the type which can be removed at least from said wheel cover, said wheel cover having receptacles for the insertion of the bolts for fixing the rim to the axle of the motor vehicle, said mechanical interconnection elements being separate from the bolts for fixing the wheel to the axle of the motor vehicle.

BRIEF DESCRIPTION OF THE DRAWINGS

Further characteristics and advantages of the invention will become better apparent from the following detailed description of a preferred but non-exclusive embodiment thereof, illustrated by way of non-limiting example in the accompanying drawings, wherein.

DESCRIPTION OF THE PREFERRED EMBODIMENTS

Figure 1:
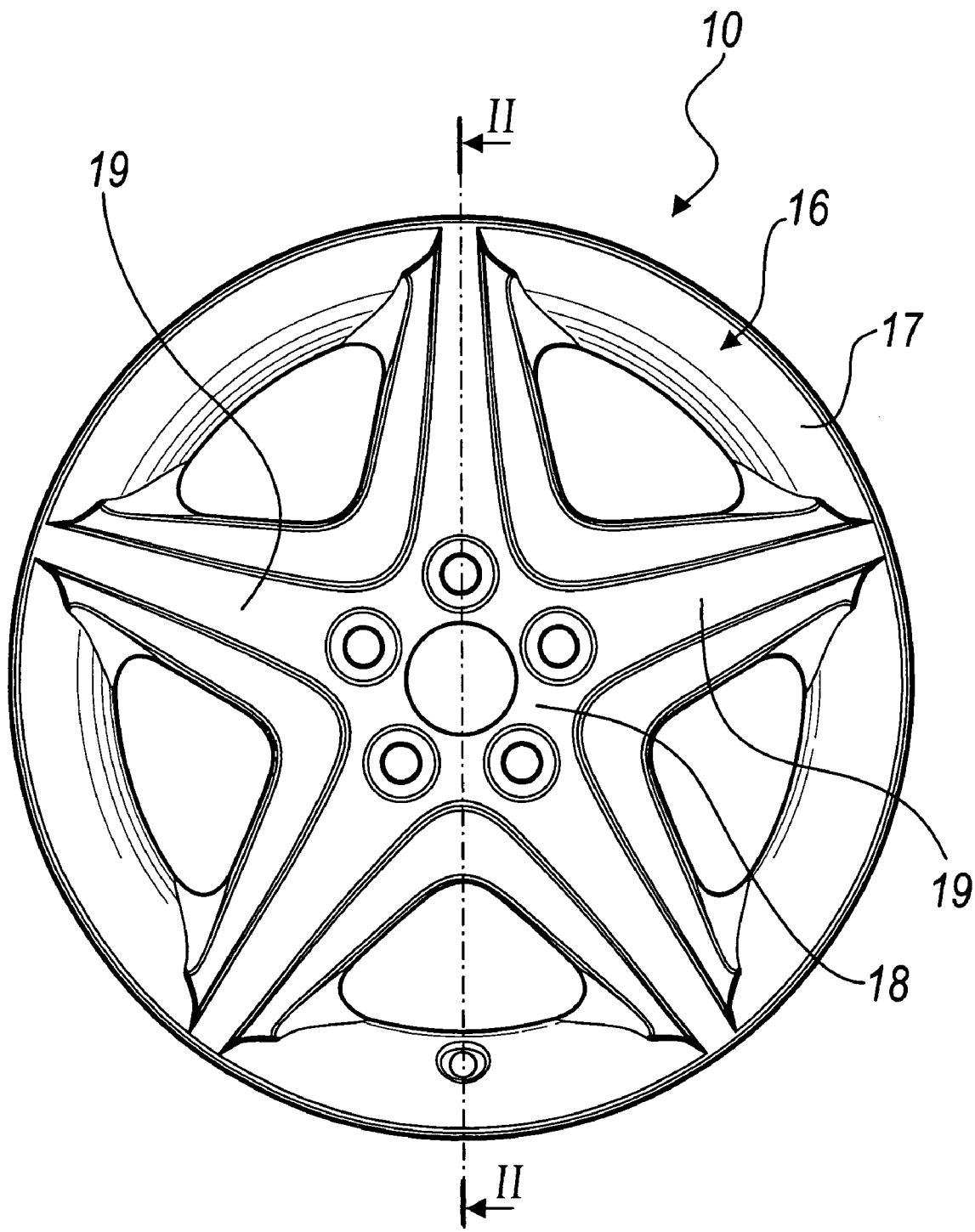
FIG. 1 is a front view of a wheel according to the invention.

It is noted that anything found to be already known during the patenting process is understood not to be claimed and to be the subject of a disclaimer.

With reference to the figures, a wheel according to the invention is generally designated by the reference numeral 10.

Figure 2:
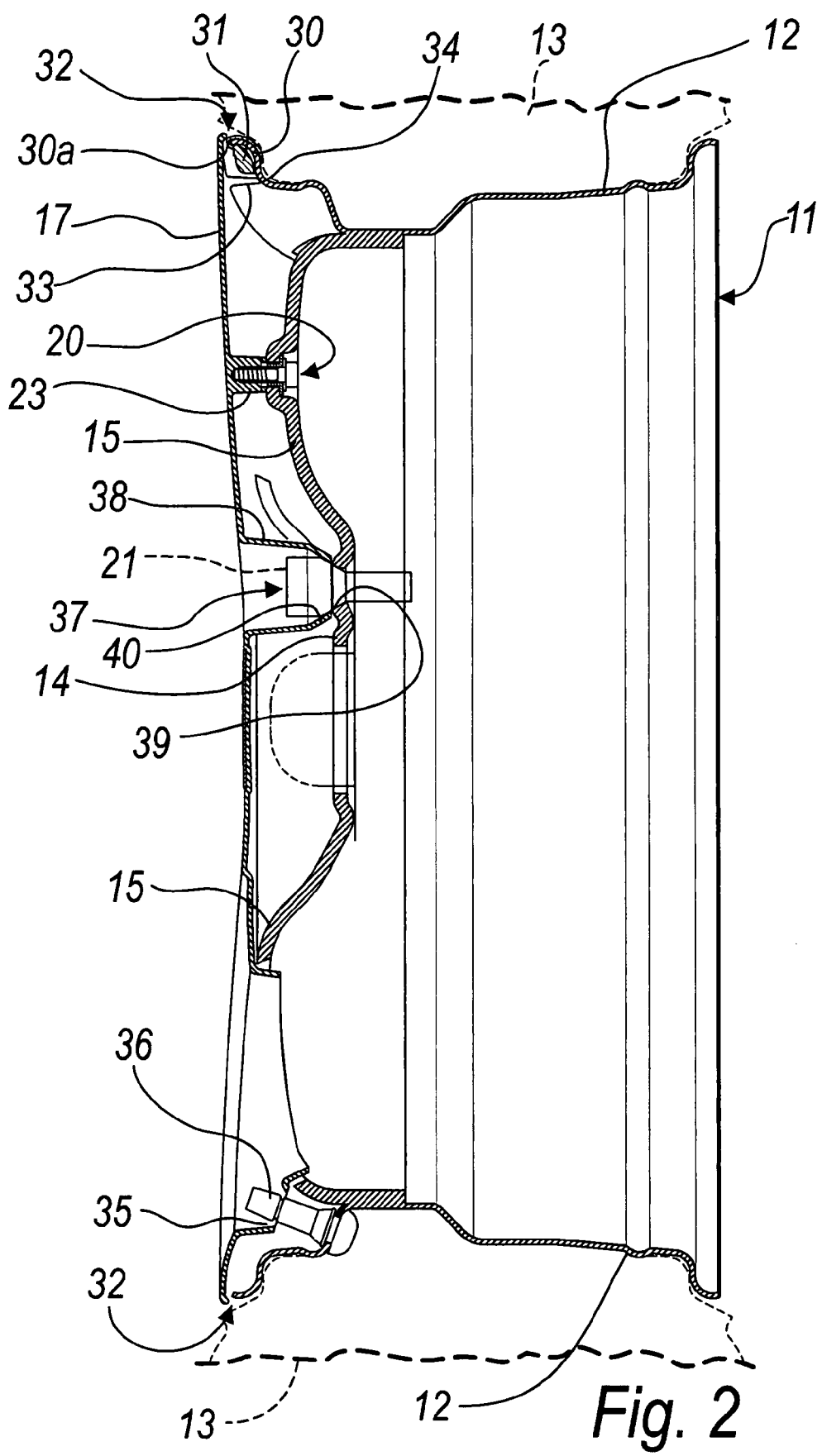
FIG. 2 is a transverse sectional view, taken along the line II-II of FIG. 1, of the wheel according to the invention.
Figure 3:
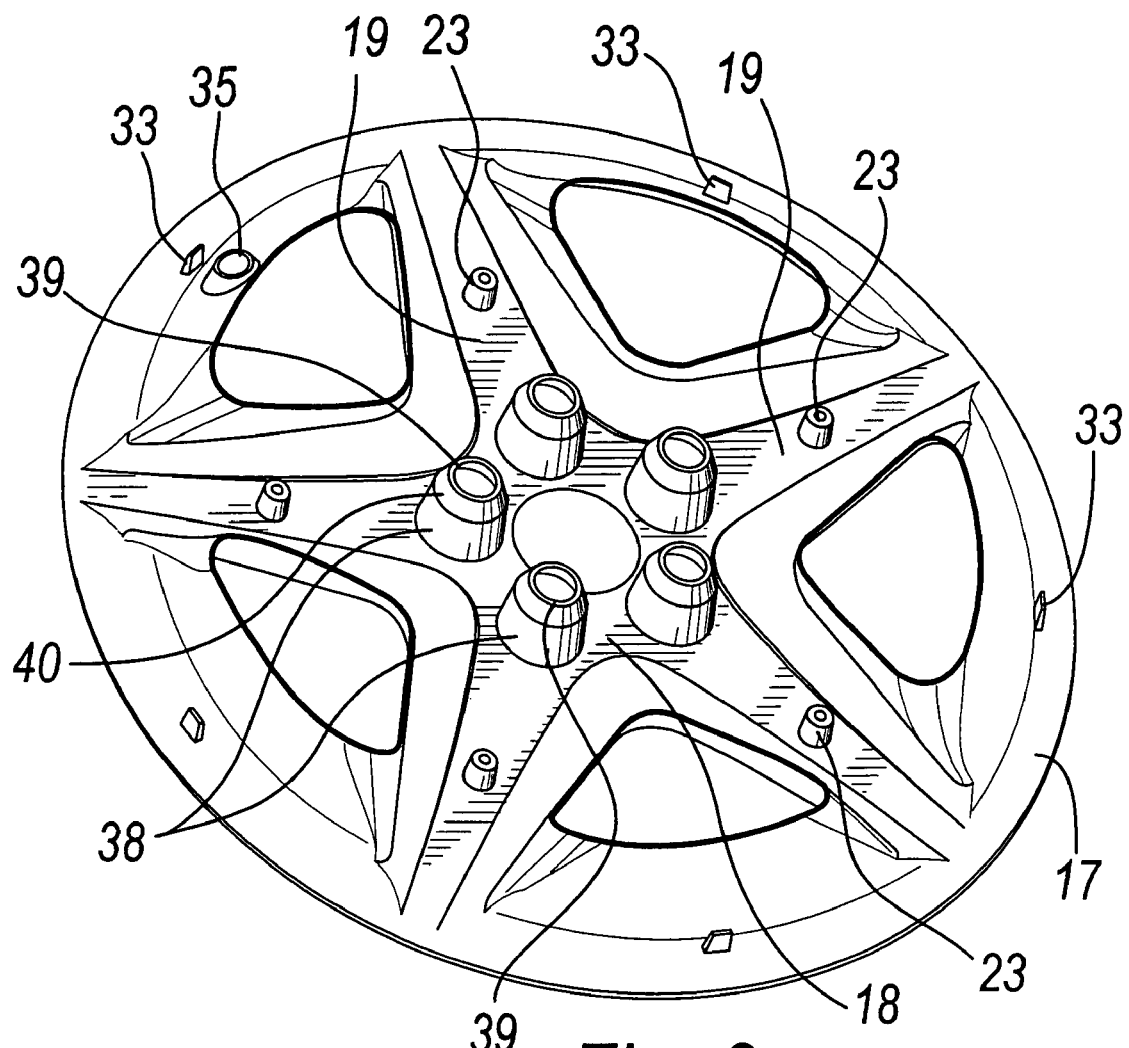
FIG. 3 is a perspective view of the hidden part of a wheel cover which composes the wheel of the preceding figures.
Figure 4:
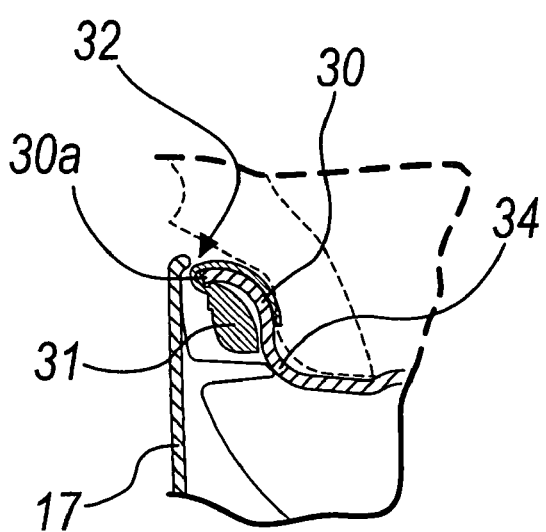
FIG. 4 is an enlarged view of a first detail of FIG. 2.
Figure 5:
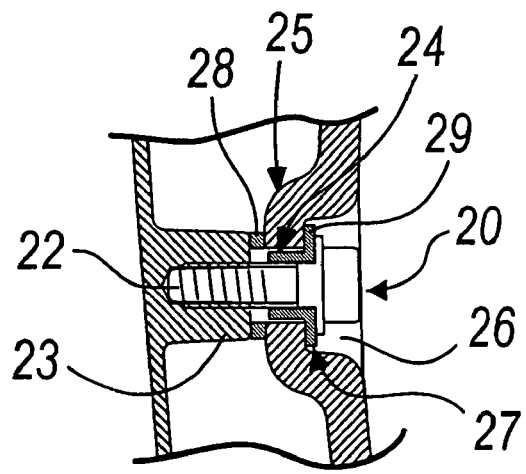
FIG. 5 is an enlarged view of a second detail of FIG. 2.

The wheel 10 comprises a structural body 11, which is made of steel and is formed by an outer rim 12 with which a tire, shown in broken lines in FIG. 2 and designated by the reference numeral 13, is to be associated, by a hub 14 and by at least one element 15 for connecting the rim 12 to the hub 14.

In this embodiment there are several connecting elements 15, such as five spokes, which are referenced hereinafter by the same numeral 15, but the invention is independent of the number of spokes and it is even possible to have a single large connecting element which in practice occupies all the space between the rim 12 and the hub 14.

Advantageously, the wheel also comprises a wheel cover 16 for covering the visible parts of the structural body 11, where the expression "visible parts" references the parts of the wheel, with a tire fitted thereon, which would be visible once said wheel is applied to an ordinary motor vehicle.

The wheel cover 16 is made of light alloy, such as for example aluminum alloy; other light alloy materials which can be used are for example a magnesium alloy or a zinc-aluminum-magnesium alloy.

The wheel cover 16 is formed as a single part having a three-dimensional contour and is constituted by an outer ring 17, a central portion 18, and additional covering spokes 19, which connect the outer ring 17 to the central portion 18; the contour of the wheel cover 16 overlaps the contour of the structural body 11 and in practice the outside diameter of the outer ring 17 is larger than the outside diameter of the rim 12.

The wheel cover 16 is fixed to the structural body 11 by means of mechanical interconnection elements 20 of the type which can be removed at least from the wheel cover 16 and which are provided and are mountable separate from bolts 21 for fixing the wheel 10 to the motor vehicle axle.

The mechanical interconnection elements 20, in the preferred embodiment, are constituted by screws 22 of the self-locking type, which are arranged in holes provided in the wheel cover 16 and correspondingly in the connecting elements formed by the spokes 15.

Said holes are constituted, for each screw (in the described embodiment), by the hole of a small threaded boss 23, which protrudes from the face of the wheel cover 16 which is directed toward the structural body 11, and by a through hole 24 formed in a corresponding spoke 15; the head of the screw 22 abuts against the inner side of the corresponding spoke 15.

It is evident that the screws 22 can be accessed by acting from the inner part of the wheel 10.

In particular, in order to avoid interference with the brake of the wheel assembly constituted by the wheel 10, at each through hole 24 provided in the corresponding spoke 15 through which a screw 22 is arranged there is a camber 25 toward the outside of the corresponding spoke 15.

The camber 25 forms, from the inner side of the spoke 15, a recess 26 for the head of the screw 22 which is associated with the corresponding through hole 23 provided in said spoke.

In this manner, the head of the screw 22 does not protrude with respect to the thickness of the spoke 15, thus optimizing the space that can be occupied by the brake of the wheel associated with the vehicle.

Advantageously, electrical insulation elements 27 are provided between each screw 22 and the corresponding spoke 15, as well as between the spoke 15 and the wheel cover 16 at each screw 22, so as to avoid corrosion problems due to the different electrochemical potentials of the materials.

The electrical insulation elements 27 are constituted by a Teflon® (PTFE) washer 28, which is arranged so as to surround each screw 22 between the spoke 15 and the wheel cover 16, and by a Teflon® (PTFE) bushing 29, which is arranged in the through hole 24 and has one end adapted to be interposed between the head of the screw 22 and the bottom of the recess 26 on which said head of the screw 22 is arranged.

An annular concave portion 30 is provided on the outer peripheral region of the rim 12, is directed toward the outside of the wheel and is suitable to accommodate counterweights 31 for balancing the wheel assembly (wheel with tire).

The wheel cover 16 is superimposed, as mentioned, on the entire structural body 11 and accordingly is also superimposed, with the outer ring 17, on the concave annular portion 30, concealing and protecting the counterweights 31.

Conveniently, an annular space 32 is provided between the concave annular portion 30 and the outer peripheral part of the wheel cover 16 which corresponds to the outer end portion of the outer ring 17 and allows to discharge the water that penetrates between the structural body 11 and the wheel cover 16.

In particular, the wheel cover 16 protrudes radially with respect to the outer terminal edge 30a of the concave annular portion 30, substantially so as to hide from sight the annular space 32.

A plurality of tabs 33, arranged along a circle, protrude from the inner face of the wheel cover 16.

The tabs 33 are suitable to be arranged in contact, with their end, against the inner edge 34 of the concave annular portion 30 for accommodating the counterweights 31.

A through hole 35 for the outward passage of a valve 36 of the tire 13, is provided on the wheel cover 16 at the outer ring 17.

Receptacles 37 for inserting the bolts 21 for fixing the wheel cover 10 to the axle of the motor vehicle are provided on the central portion 18 of the wheel cover 16.

Each receptacle 37 is constituted by a tubular portion 38 of the wheel cover 16 which is recessed toward the hub 14 and has, at a bottom hole 39, on the side wall, a portion which tapers toward the inside 40 and is adapted to delimit the bottom hole 39.

In the bolts 21 for fixing to the wheel, according to a well-established embodiment, the portion for blending the head to the threaded stem in fact is a frustum portion that tapers toward said stem.

The diameter of the bottom hole 39 of each receptacle 37 is smaller than the maximum diameter of the head of the corresponding bolt 21 so that the inward-tapering portion 40 of the receptacle 37 is undercut with respect to the head of the bolt.

Figure 6:
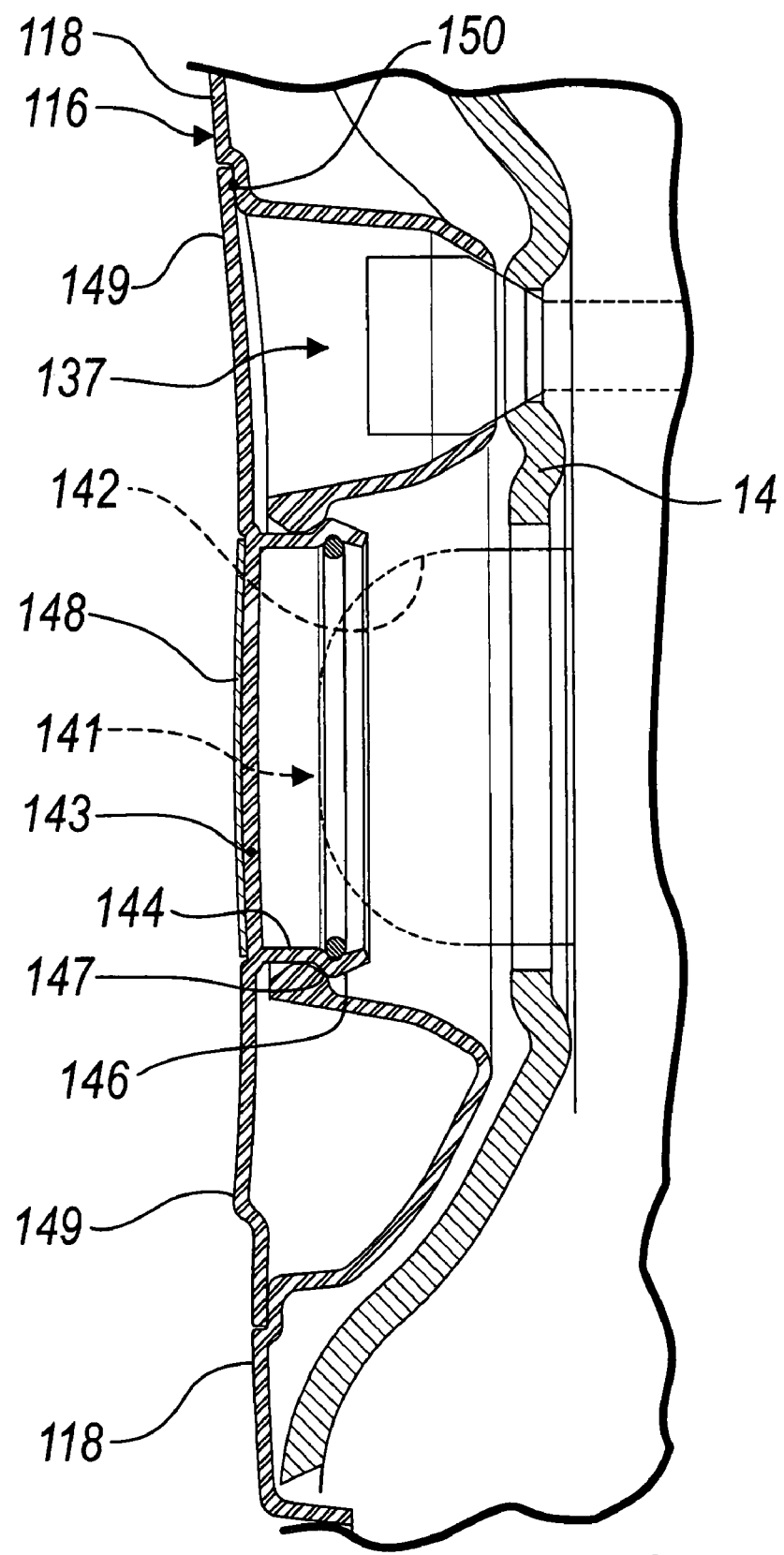
FIG. 6 is a transverse sectional view of a portion of another embodiment of the wheel according to the invention.

FIG. 6 illustrates a different embodiment of the wheel cover, now designated by the reference numeral 116.

In this embodiment, the central portion 118 is provided with a central opening 141 at the central abutment 142 of the axle of the vehicle, which is closed by a plug 143 which is preferably made of the same material as the rest of the wheel cover 116.

The plug 143 has a cylindrical portion 144 to be inserted in the central opening 141, which ends with a circumferential protrusion 146 which is suitable to be arranged as an undercut, by elastic deformation, with respect to a corresponding circumferential recess 147 formed on the inner wall of the central opening 141.

The plug 143 is provided centrally with a part to which a logo 148 is to be applied.

Advantageously, the plug 143 has a plate-like protrusion 149 which protrudes laterally with respect to the cylindrical portion 144 and is suitable to hide from sight the receptacles 137; in particular, the end edge of the plate-like protrusion 149 is arranged within a complimentarily shaped hollow 150 provided on the central portion 118 of the wheel cover 116 proximate to the part of the receptacles 137 that lies furthest from the center of the central portion 118.

The plug 143 is removable by simple elastic deformation when it is necessary to unscrew the bolts 21.

In practice it has been found that the invention thus described solves the problems noted in known types of motor vehicle wheel.

In particular, the present invention provides a motor vehicle wheel which is made of steel as regards the structural part and of light alloy as regards the aesthetic part, thus obtaining a low-cost wheel which at the same time has the aesthetic features of a light alloy wheel.

In practice, the wheel cover covers completely the structural steel body and offers a three-dimensional appearance which is entirely similar to light alloy wheels.

The fact that screws are used to fix the light alloy wheel cover to the steel structural body allows to achieve a fixing which is stable and reliable over time and if necessary to remove said wheel cover simply and quickly, for example to rebalance the wheel.

The preferential choice to allow accessibility to the screws for locking the wheel cover to the spoke by rear access to the wheel allows to protect the wheel cover against theft.

Alternative embodiments can provide for visible screws on the wheel cover which engage the structural body.

Instead of the screws, it is possible to conceive other elements for fixing the wheel cover to the structural body, such as for example reversible expansion plugs which can be inserted in corresponding holes of the wheel cover and of the structural body.

Other embodiments can have mechanical fixing elements which are integrated in the structural body and can be associated with the wheel cover (and therefore are detachable only from the wheel cover but not from the structural body), such as for example pins which protrude from the spokes and are suitable to match complementary through holes formed in the wheel cover and locking elements to be fixed to the tip of said pins so as to avoid the disengagement of said wheel cover from the pins.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

What is claimed is:

1. A motor vehicle wheel, comprising:
   a structural circular body made of steel that is axially fixable to an axle of a vehicle and has an inner side arrangeable in use so as to face the vehicle axle and an opposite outer side that is visible when the wheel is mounted to the vehicle axle, said body being composed of an outer rim on which a tire is mountable, of a hub and of at least one connecting element for connecting said rim to said hub;
   bolts having respective stems and fixing heads for fixing said structural body to an axle of the motor vehicle;
   a wheel cover made of metallic light alloy that has an inner face and an opposite outer face and is removably fixable at the inner face over said structural body for covering said visible outer side of the structural body, said wheel cover comprising bosses that protrude axially from the inner face of the wheel cover, said bosses comprising each dead holes axially extending therein;
   mechanical interconnection elements for removably connecting said wheel cover to said structural body and which are made so as to be fixable into and removable from said dead holes of the wheel cover only by action from the inner side of the structural body;
   receptacles provided in said wheel cover for insertion of said bolts, said receptacles being each constituted by a tubular portion that has a bottom hole that opens onto said inner face of the wheel cover, said bottom hole having a diameter that is smaller than a maximum diameter of the fixing head of a said bolt;
   wherein said mechanical interconnection elements are provided separate from the bolts for fixing the wheel to the axle of the motor vehicle, said bosses being provided at locations on said wheel cover that are radially offset with respect to said receptacles,
   and wherein said wheel cover comprises: a central portion which is suitable to be superimposed on said hub, said central portion having a central opening arrangeable at a central abutment of an axle of the vehicle; and a plug for closing said central opening, said plug having a cylindrical portion for insertion in said central opening, said cylindrical portion ending with a circumferential protrusion which is suitable to engage, by elastic deformation, a corresponding circumferential recess formed on an inner wall of said central opening, and said plug having further a plate-shaped protrusion, which protrudes laterally with respect to said cylindrical portion and is suitable to hide from sight said receptacles.

2. The wheel of claim 1, wherein said mechanical interconnection elements are constituted by screws, each of said screws being insertable in a respective one of said dead holes formed in said bosses protruding from the wheel cover.

3. The wheel of claim 1, wherein said dead holes are threaded and are each suitable to be engaged by a respective threaded end of said screws, said screws being each further insertable through a respective through hole which is provided in said at least one connecting element of the structural body, each one of said screws having a head that is suitable to abut, upon fixing of the wheel cover to said structural body, against an inner side of said at least one connecting element, said head being accessible for acting thereon from the inner side of the structural body.

4. The wheel of claim 3, wherein said at least one connecting element is provided with a camber that convexly arches on said outer side of the structural body, said through hole being provided in said camber and said camber forming at said inner side of the structural body a respective recess for accommodating the head of a said screw.

5. The wheel of claim 4, comprising electrical insulation elements located between each said screw and said at least one connecting element and between said at least one connecting element and said wheel cover.

6. The wheel of claim 5, wherein said electrical insulation elements comprise each: a washer, made of PTFE, which is arrangeable so as to surround each of said screws between said at least one connecting element and said wheel cover; and a bushing made of PTFE, which is arranged in each one of said through hole; said bushing having an end which is suitable to be interposed between a head of respective one of said screws and a bottom part of respective one of said recesses on which the respective screw head is arranged.

7. The wheel of claim 1, wherein said outer rim has, on an outer peripheral region thereof located at said outer side of the structural body, a concave annular portion forming an accommodating annular cavity suitable to accommodate counterweights for balancing the wheel, said wheel cover being superimposed on said concave annular portion, an annular space for discharging water being provided between an outer edge of said concave annular portion and a peripheral part of the inner side of said wheel cover.

8. The wheel of claim 7, wherein said wheel cover is fixed to said structural body so as to protrude radially with respect to the outer edge of said concave annular portion, substantially so as to hide from sight said annular space.

9. The wheel of claim 1, wherein said tubular portion of each said receptacle comprises a tapering end region that surrounds said bottom hole, said fixing heads of said bolts for fixing to the structural body to the axle of the vehicle having each a frustum part connecting to the stem of the bolt, said frustum part tapering toward said stem and being suitable to arrange at said tapering end region of said tubular portion of said receptacle.

10. The wheel of claim 1, wherein said wheel cover has a through hole for outward passage of a valve of a tire.

11. The wheel of claim 7, wherein said wheel cover has a plurality of tabs which are arranged thereon along a circle and protrude axially from the inner face thereof, said tabs having free ends that are suitable to contact, upon fixing the wheel cover to said structural body, an inner edge of said concave annular portion for accommodating counterweights.

12. The wheel of claim 1, wherein said plate-shaped protrusion has an end edge that is arrangeable within a complimentarily shaped hollow formed on said central portion at the outer face so that said plate-shaped protrusion completely overlaps said receptacles.

13. The wheel of claim 1, wherein said plug is provided centrally with a part suitable for application of a logo.

14. A motor vehicle wheel, comprising:
a structural circular body made of steel that is axially fixable to an axle of a vehicle and has an inner side arrangeable in use so as to face the vehicle axle and an opposite outer side that is visible when the wheel is mounted to the vehicle axle, said body being composed of an outer rim on which a tire is mountable, of a hub and of at least one connecting element for connecting said rim to said hub;
bolts having respective stems and fixing heads for fixing said structural body to an axle of the motor vehicle;
a wheel cover made of metallic light alloy that has an inner face and an opposite outer face and is removably fixable at the inner face over said structural body for covering said visible outer side of the structural body, said wheel cover comprising bosses that protrude axially from the inner face of the wheel cover, said bosses comprising each dead holes axially extending therein;
mechanical interconnection elements for removably connecting said wheel cover to said structural body and which are made so as to be fixable into and removable from said dead holes of the wheel cover only by action from the inner side of the structural body;
receptacles provided in said wheel cover for insertion of said bolts, said receptacles being each constituted by a tubular portion that has a bottom hole that opens onto said inner face of the wheel cover, said bottom hole having a diameter that is smaller than a maximum diameter of the fixing head of a said bolt;
wherein said mechanical interconnection elements are provided separate from the bolts for fixing the wheel to the axle of the motor vehicle, said bosses being provided at locations on said wheel cover that are radially offset with respect to said receptacles,
and wherein said wheel cover comprises: a central portion which is suitable to be superimposed on said hub, said central portion having a central opening arrangeable at a central abutment of an axle of the vehicle; and a plug for closing said central opening, said plug having a cylindrical portion for insertion in said central opening, said cylindrical portion ending with a circumferential protrusion which is suitable to engage, by elastic deformation, a corresponding circumferential recess formed on an inner wall of said central opening, and said plug having further a plate-shaped protrusion, which protrudes laterally with respect to said cylindrical portion, said plate-shaped protrusion having an end edge that is arrangeable within a complimentarily shaped hollow formed on said central portion at the outer face so that the plate-shaped protrusion completely overlaps said receptacles.

* * * * *